(12) United States Patent
Han et al.

(10) Patent No.: US 11,567,240 B2
(45) Date of Patent: Jan. 31, 2023

(54) MULTILAYERED META LENS AND OPTICAL APPARATUS INCLUDING THE SAME

(71) Applicants: SAMSUNG ELECTRONICS CO., LTD., Suwon-si (KR); UNIVERSITY OF MASSACHUSETTS, Boston, MA (US)

(72) Inventors: Seunghoon Han, Seoul (KR); Mahdad Mansouree, Sunderland, MA (US); Amir Arbabi, Sunderland, MA (US); Suyeon Lee, Seoul (KR)

(73) Assignees: SAMSUNG ELECTRONICS CO., LTD., Suwon-si (KR); UNIVERSITY OF MASSACHUSETTS, Boston, MA (US)

( * ) Notice: Subject to any disclaimer, the term of this patent is extended or adjusted under 35 U.S.C. 154(b) by 624 days.

(21) Appl. No.: 16/574,943

(22) Filed: Sep. 18, 2019

(65) Prior Publication Data
US 2020/0264343 A1    Aug. 20, 2020

(30) Foreign Application Priority Data

Feb. 15, 2019    (KR) .................. 10-2019-0017963

(51) Int. Cl.
*G02B 3/00*    (2006.01)
*G02B 1/00*    (2006.01)
*G02B 1/14*    (2015.01)

(52) U.S. Cl.
CPC .............. *G02B 3/00* (2013.01); *G02B 1/002* (2013.01); *G02B 1/14* (2015.01); *G02B 2003/0093* (2013.01); *G02B 2207/101* (2013.01)

(58) Field of Classification Search
CPC .. G02B 1/002; G02B 1/14; G02B 2003/0093; G02B 2207/101; G02B 3/00
See application file for complete search history.

(56) References Cited

U.S. PATENT DOCUMENTS

| | | | |
|---|---|---|---|
| 9,995,930 B2 | 6/2018 | Arbabi et al. | |
| 10,431,624 B2 | 10/2019 | Han et al. | |
| 11,150,387 B2* | 10/2021 | Shin | G02B 27/4277 |
| 2015/0219806 A1* | 8/2015 | Arbabi | G02B 5/1842 |
| | | | 29/436 |

(Continued)

FOREIGN PATENT DOCUMENTS

KR    10-2017-0007079 A    1/2017

OTHER PUBLICATIONS

Minggui Wei et al., "Multi-wavelength lenses for terahertz surface wave", Optics Express, vol. 25, No. 21, Oct. 16, 2017, pp. 24872-24879.

(Continued)

*Primary Examiner* — Joseph P Martinez
*Assistant Examiner* — Vipin Patel
(74) *Attorney, Agent, or Firm* — Sughrue Mion, PLLC

(57) ABSTRACT

A meta-lens includes a first layer that is arranged on a substrate and that includes a plurality of first nanostructures and a second layer including a plurality of second nanostructures separately arranged from the first nanostructures. The meta-lens may focus light of a plurality of wavelengths or light of a wide wavelength bandwidth due to the arrangement of the nanostructures in a multilayer structure.

19 Claims, 15 Drawing Sheets

(56) References Cited

U.S. PATENT DOCUMENTS

2018/0322645 A1  11/2018  Han et al.

OTHER PUBLICATIONS

Yuhan Yao et al., "Spectrum splitting using multi-layer dielectric meta-surfaces for efficient solar energy harvesting", Applied Physics A, vol. 115, Issue 3, Springer, Apr. 23, 2014, pp. 713-719.
Jun Ding et al., "Dual-Wavelength Terahertz Metasurfaces with Independent Phase and Amplitude Control at Each Wavelength", Scientific Reports, vol. 6, No. 34020, Sep. 23, 2016, pp. 1-9.
Mahdad Mansouree et al., "Large-scale Metasurface Design using the Adjoint Sensitivity Technique", CLEO, Optical Society of America, 2018, 2 pages.

\* cited by examiner

FIG. 9
(COMPARATIVE EXAMPLE)　　(EMBODIMENT)
920nm 
850nm 
780nm 
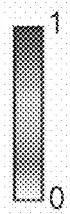

MULTILAYERED META LENS AND OPTICAL APPARATUS INCLUDING THE SAME

CROSS-REFERENCE TO RELATED APPLICATION

This application is based on and claims priority under 35 U.S.C. § 119 to Korean Patent Application No. 10-2019-0017963, filed on Feb. 15, 2019, in the Korean Intellectual Property Office, the disclosure of which is incorporated herein in its entirety by reference.

BACKGROUND

1. Field

The disclosure relates to multilayered meta-lenses and optical apparatuses including the multilayered meta lenses.

2. Description of Related Art

Optical sensors that use a semiconductor-based sensor array are increasingly used in mobile devices, wearable devices, and the Internet of Things.

The miniaturization of such devices is required, but there is difficulty in reducing the thickness of optical lenses included in the above devices. This is because in a lens in which optical performance is controlled by using a curvature, refractive power of the lens increases as the radius of curvature of the lens decreases, and as the radius of curvature decreases, the thickness of the lens in an optical axis direction becomes larger.

Accordingly, attempts have been conducted to realize a flat and thin lens based on a meta-surface. However, there are difficulties in realizing a desired refractive power, controlling a chromatic aberration, etc.

SUMMARY

Meta-lenses configured to focus light of multi-wavelength bandwidths are provided.

Additional aspects will be set forth in part in the description which follows and, in part, will be apparent from the description, or may be learned by practice of the presented embodiments.

In accordance with an aspect of the disclosure, a meta-lens includes a substrate; a first layer arranged on the substrate, the first layer comprising a plurality of first nanostructures comprising a material having a refractive index different from a refractive index of the substrate; a spacer layer covering the plurality of first nanostructures, the spacer layer comprising a material having a refractive index different from the refractive index of the plurality of first nanostructures; and a second layer arranged on the spacer layer, the second layer comprising a plurality of second nanostructures comprising a material having a refractive index different from the refractive index of the spacer layer.

A first shape distribution of the plurality of first nanostructures and a second shape distribution of the plurality of second nanostructures may be set so as to focus light of a first wavelength and light of a second wavelength different from the first wavelength at a same focal length.

The first shape distribution and the second shape distribution may be configured to focus light of a wavelength bandwidth including the first wavelength and the second wavelength.

The wavelength bandwidth may include one from among a red wavelength bandwidth, a green wavelength bandwidth, and a blue wavelength bandwidth.

The wavelength bandwidth may include a red wavelength bandwidth, a green wavelength bandwidth, and a blue wavelength bandwidth.

A dimension of the plurality of first nanostructures and the plurality of second nanostructures may be less than the first wavelength and less than the second wavelength.

A first height of the plurality of first nanostructures and a second height of the plurality of second nanostructures in a direction of stacking the first layer and the second layer may be in a range from $\lambda/3$ to $(3\lambda)/2$, where $\lambda$ is a longer wavelength of the first wavelength and the second wavelength.

A separation distance between the plurality of first nanostructures and the plurality of second nanostructures in the stacking direction may be in a range from $\lambda/4$ to $2\lambda$, where $\lambda$ is a longer wavelength of the first wavelength and the second wavelength.

The first shape distribution may be different from the second shape distribution.

Each nanostructure from among the plurality of first nanostructures and the plurality of second nanostructures may have a column shape.

Each first nanostructure from among the plurality of first nanostructures may have a first height different from a second height of each second nanostructure from among the plurality of second nanostructures.

A difference between the first height and the second height may be set so that the meta-lens operates as a reflection type lens.

The difference between the first height and the second height may be $\lambda/4$ or greater where $\lambda$ is a longer wavelength of the first wavelength and the second wavelength.

The difference between the first height and the second height may be set so that the meta-lens operates as a transmission type lens.

The difference between the first height and the second height may be $\lambda/3$ or less where $\lambda$ is a longer wavelength of the first wavelength and the second wavelength.

The refractive index of the substrate may be less than the refractive index of the plurality of first nanostructures and less than the refractive index of the plurality of second nanostructures, and the refractive index of the spacer layer may be less than the refractive index of the plurality of first nanostructures and less than the refractive index of the plurality of second nanostructures.

A difference between the refractive index of the substrate and the refractive index of the plurality of first nanostructures may be 0.5 or greater.

A difference between the refractive index of the plurality of first nanostructures and the refractive index of the spacer layer may be 0.5 or greater.

A difference between the refractive index of the spacer layer and the refractive index of the plurality of second nanostructures may be 0.5 or greater.

The meta-lens may further include a protection layer covering the plurality of second nanostructures.

A difference between a refractive index of the protection layer and the refractive index of the plurality of first nanostructures may be 0.5 or greater.

An imaging apparatus may include an imaging lens including the meta-lens in accordance with the above-noted aspect of the disclosure; and an image sensor configured to convert an optical image formed by the imaging lens into an electrical signal.

BRIEF DESCRIPTION OF THE DRAWINGS

These and/or other aspects will become apparent and more readily appreciated from the following description taken in conjunction with the accompanying drawings in which:

FIG. 9 is a diagram showing an intensity distribution on a focus plane of the meta-lens of FIG. 1 and a meta-lens according to a comparative example focusing light of a predetermined wavelength;

DETAILED DESCRIPTION

Figure 1:
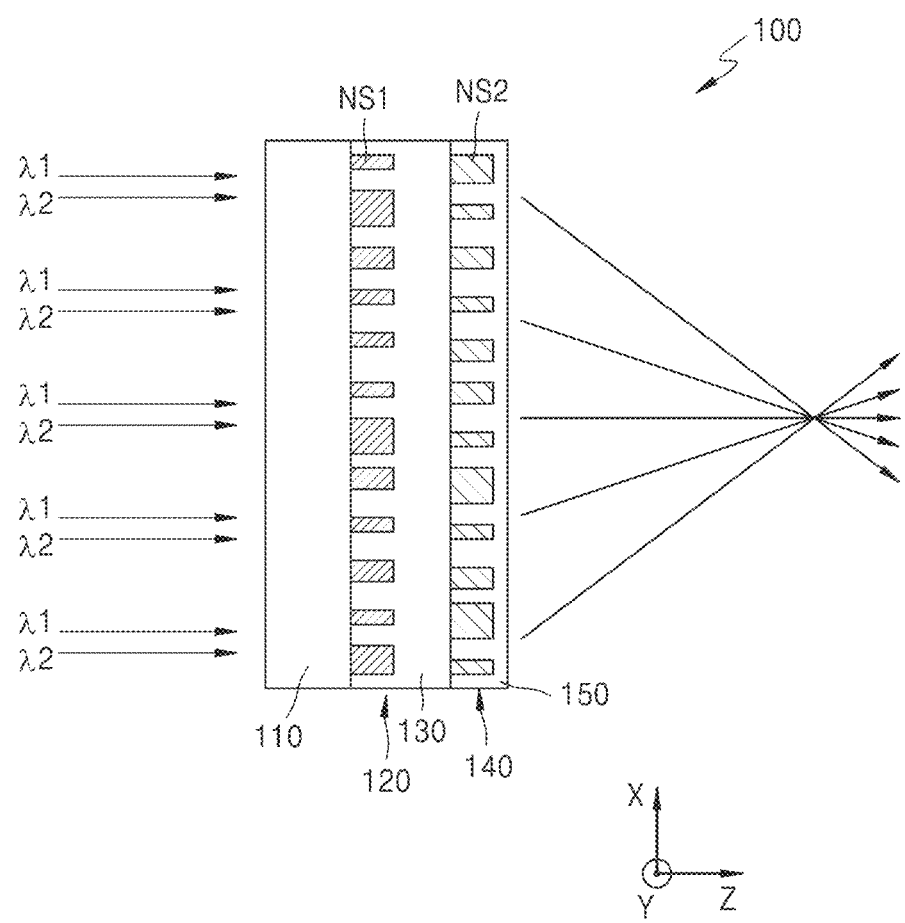
FIG. 1 is a schematic cross-sectional view of a meta-lens according to an embodiment.

Reference will now be made in detail to embodiments, examples of which are illustrated in the accompanying drawings. Embodiments are capable of various modifications and may be embodied in many different forms. In the drawings, like reference numerals refer to like elements throughout and sizes of the constituent elements are exaggerated for clarity and convenience of description.

When an element or layer is referred to as being "on" or "above" another element or layer, the element or layer may be directly on another element or layer or there may be intervening elements or layers.

Although the terms "first", "second", etc. may be used herein to describe various elements, these elements should not be limited by these terms. These terms are only used to distinguish one element from another.

The singular forms of terms in the disclosure include the plural forms unless the context clearly indicates otherwise. Also, when a region "includes" an element, the region may further include another element instead of excluding the other element, unless otherwise differently stated.

Also, in the specification, the term "units" or "modules" denote units or modules that process at least one function or operation, and may be realized by hardware, software, or a combination of hardware and software. Units and modules described in the specification may be divided or combined into other units and modules unless specifically stated otherwise.

The term "above" and similar directional terms may be applied to both singular and plural terms.

Also, the operations of all methods described herein may be performed in any suitable order unless otherwise indicated herein or otherwise clearly contradicted by context. The use of any and all examples, or exemplary language (e.g., "such as") provided herein, is intended merely to better illuminate aspects of the disclosure and does not pose a limitation on the scope of the disclosure unless otherwise claimed.

Figure 2:
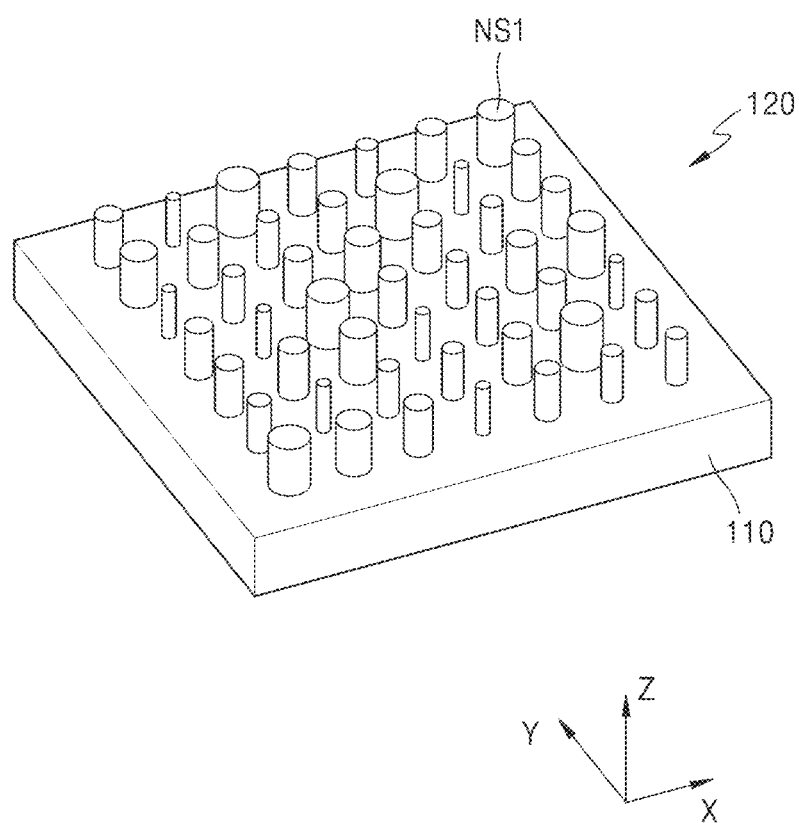
FIG. 2 is a perspective view of an example structure of a first layer of the meta-lens of FIG. 1 according to an embodiment.
Figure 3:
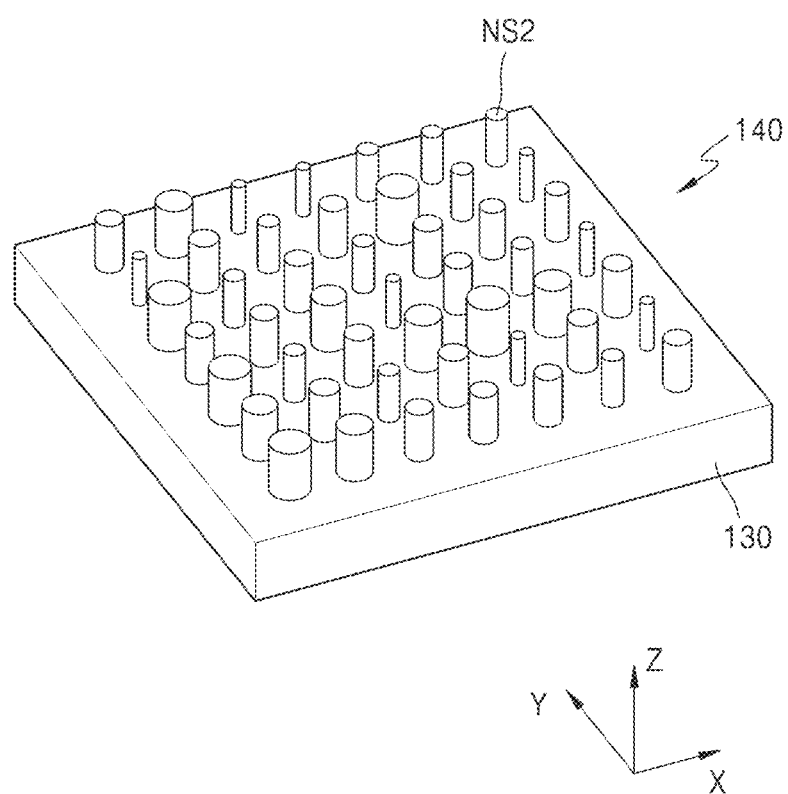
FIG. 3 is a perspective view of an example structure of a second layer of the meta-lens of FIG. 1 according to an embodiment.
Figure 4:
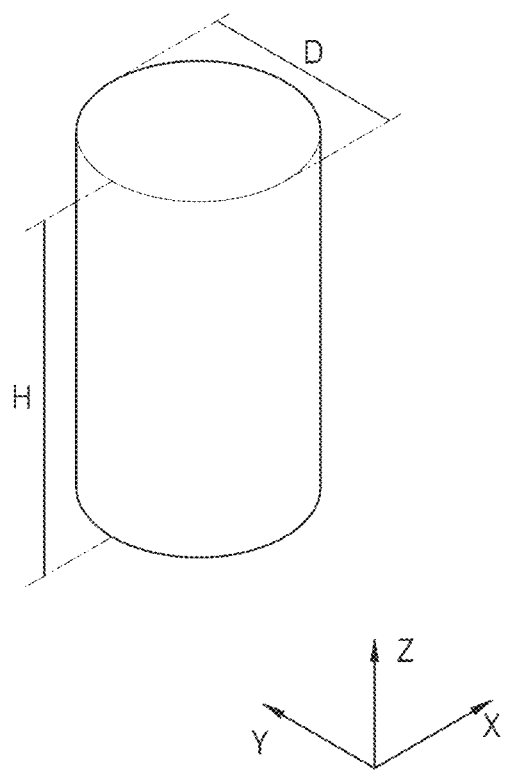
FIG. 4 is a perspective view of an example shape of a nanostructure to be included in the meta-lens of FIG. 1 according to an embodiment.
Figure 5:
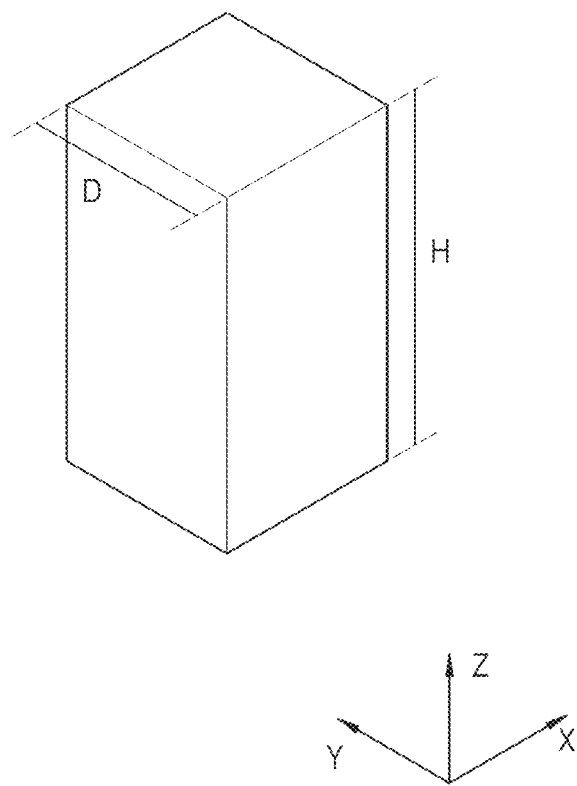
FIG. 5 is a perspective view of another example shape of a nanostructure to be included in the meta-lens of FIG. 1 according to an embodiment.

FIG. 1 is a schematic cross-sectional view of a meta-lens 100 according to an embodiment. FIG. 2 is a perspective view of an example structure of a first layer 120 of the meta-lens 100 of FIG. 1. FIG. 3 is a perspective view of an example structure of a second layer 140 of the meta-lens 100 of FIG. 1. FIGS. 4 and 5 are perspective views of example shapes of a nanostructure to be included in the meta-lens 100 of FIG. 1.

The meta-lens 100 includes a substrate 110, a first layer 120 that is formed on the substrate 110 and includes a plurality of first nanostructures NS1, and a second layer 140 including a plurality of second nanostructures NS2 separated from the first layer 120. The meta-lens 100 may further include a spacer layer 130 covering the plurality of first nanostructures NS1, and the plurality of second nanostructures NS2 may be formed on the spacer layer 130. Also, a protection layer 150 covering the plurality of second nanostructures NS2 may further be included in the meta-lens 100.

The plurality of first nanostructures NS1 and the plurality of second nanostructures NS2 may have a shape distribution for focusing light of a first wavelength $\lambda 1$ and light of a second wavelength $\lambda 2$ different from the first wavelength $\lambda 1$ to the same focal length. The 'shape distribution' is used as a term meaning any one or more of shape, size, arrangement pitch, shape distribution for each position, size distribution for each position, and arrangement pitch distribution for each position, with respect to each of the first nanostructure NS1 and the second nanostructure NS2.

The shape distribution of the plurality of first nanostructures NS1 arranged on the first layer 120 may be different from the shape distribution of the plurality of second nanostructures NS2 arranged on the second layer 140. The meta-lens 100 may focus light of a wavelength bandwidth including the first wavelength $\lambda 1$ and the second wavelength $\lambda 2$ according to the shape distributions of the plurality of first nanostructures NS1 and the plurality of second nanostructures NS2 respectively arranged on the first layer 120 and the second layer 140. The focusing bandwidth may be a wavelength bandwidth corresponding to any one or more of red, green, and blue colors, or a visible light wavelength bandwidth including all of red, green and blue colors. However, the present embodiment is not limited thereto.

The substrate 110 supports the first nanostructures NS1 and may include a material having a refractive index different from that of the first nanostructures NS1. A refractive index difference between the substrate 110 and the first nanostructures NS1 may be equal to or greater than 0.5. The refractive index of the first nanostructures NS1 may be greater than that of the substrate 110. However, the present embodiment is not limited thereto, that is, the refractive index of the first nanostructures NS1 may be less than that of the substrate 110.

The spacer layer 130 may support the second nanostructures NS2, and may include a material having a refractive index different from that of the second nanostructures NS2. A refractive index difference between the spacer layer 130 and the first nanostructures NS1 may be greater than 0.5 and a refractive index difference between the spacer layer 130 and the second nanostructures NS2 may be greater than 0.5. The spacer layer 130 may include a material having a refractive index less than that of the first nanostructures NS1 and less than that of the second nanostructures NS2. However, the present embodiment is not limited thereto, that is, the spacer layer 130 may have a refractive index greater than the refractive indexes of both the first nanostructures NS1 and the second nanostructures NS2.

The protection layer 150 is a layer entirely covering the plurality of second nanostructures NS2 to protect the second nanostructures NS2 and may include a material having a refractive index different from those of the first nanostructures NS1 and the second nanostructures NS2. A refractive index difference between the protection layer 150 and the plurality of first nanostructures NS1 may be equal to or greater than 0.5 and a refractive index difference between the protection layer 150 and the plurality of second nanostructures NS2 may be equal to or greater than 0.5. The protection layer 150 may include a material having a refractive index less than that of the first nanostructures NS1 and less than that of the second nanostructures NS2. However, the present embodiment is not limited thereto, that is, the protection layer 150 may have a refractive index greater than those of both the first nanostructures NS1 and the second nanostructures NS2. The present embodiment is not limited to inclusion of the protection layer 150. In other words, the protection layer 150 may be omitted.

The substrate 110 may include one of glass (fused silica, borosilicate crown, etc.), quartz, polymer (PMMA, SU-8, etc.) and plastic, or may be a semiconductor substrate. The spacer layer 130 may include a polymer material, such as SU-8, PMMA, etc., or a material having a low refractive index, such as $SiO_2$. The first nanostructures NS1 and the second nanostructures NS2 may include at least one of crystalline Si (c-Si), polycrystalline Si (p-Si), amorphous Si (a-Si), Group III-V compound semiconductor (GaP, GaN, GaAs, etc.), SiC, $TiO_2$, and SiN. The protection layer 150 may include a polymer material, such as SU-8, PMMA, etc.

The meta-lens 100 may be manufactured according to a general semiconductor manufacturing process. For example, a process of manufacturing the meta-lens 100 may include patterning a first material layer to be the first nanostructures NS1 after stacking the first material layer on the substrate 110; planarizing a material to be the spacer layer 130 after depositing or coating the material; and patterning a second material layer to be the second nanostructures NS2 after stacking the second material layer on the spacer layer 130. In this way, a stacking structure of the plurality of first nanostructures NS1, the spacer layer 130, and the plurality of second nanostructures NS2 may be monolithically formed on a single substrate.

The first nanostructures NS1 and the second nanostructures NS2 may have, as depicted in FIG. 4, a circular column shape having a diameter of D and a height of H, or, as depicted in FIG. 5, a square column shape having a length of a side D and a height of H. A cross-section of the column shape of the first nanostructures NS1 and second nanostructures NS2 is not limited to a circle or a square and may include various shapes, such as a polygonal shape, an oval shape, etc.

The first nanostructures NS1 and the second nanostructures NS2 may have a shape dimension of a sub-wavelength (i.e., smaller than a wavelength of incident light focused by the meta-lens 100). The shape dimension may denote at least one of a plurality of dimensions that define the shape of the first nanostructures NS1 and the second nanostructures NS2. For example, as depicted in FIG. 4, when the first nanostructures NS1 and the second nanostructures NS2 have a circular column shape, the diameter D may be a sub-wavelength, or as depicted in FIG. 5, the first nanostructures NS1 and the second nanostructures NS2 have a square column shape, the length D of a side of a cross-section of the square column may be a sub-wavelength.

A height of the first nanostructures NS1 and the second nanostructures NS2, that is, a thickness of the first and second layers 120 and 140, in a stacking direction (a Z-direction as shown in the figures) of the first layer 120 and the second layer 140 may have a dimension similar to a focusing wavelength of the meta-lens 100. For example, the height of the first nanostructures NS1 and the second nanostructures NS2 may be in a range from about ⅓ of the focusing wavelength to about 1.5 times the focusing wavelength.

The detailed shape distribution of the first nanostructures NS1 and the second nanostructures NS2 may be determined in consideration of an optical performance to be realized by the meta-lens 100. In the meta-lens 100 according to an embodiment, the nanostructures are arranged in a multilayer to increase a focusing bandwidth, and accordingly, variables that cause interactions between adjacent nanostructures may vary. Thus, the realization of a desired focal length and a focusing wavelength and bandwidth are possible.

In FIG. 1, it is depicted that the meta-lens 100 has a positive refractive power, but this is just an example, and the shape distribution of the first nanostructures NS1 and the second nanostructures NS2 may be set so that the meta-lens 100 has a negative refractive power.

Figure 6:
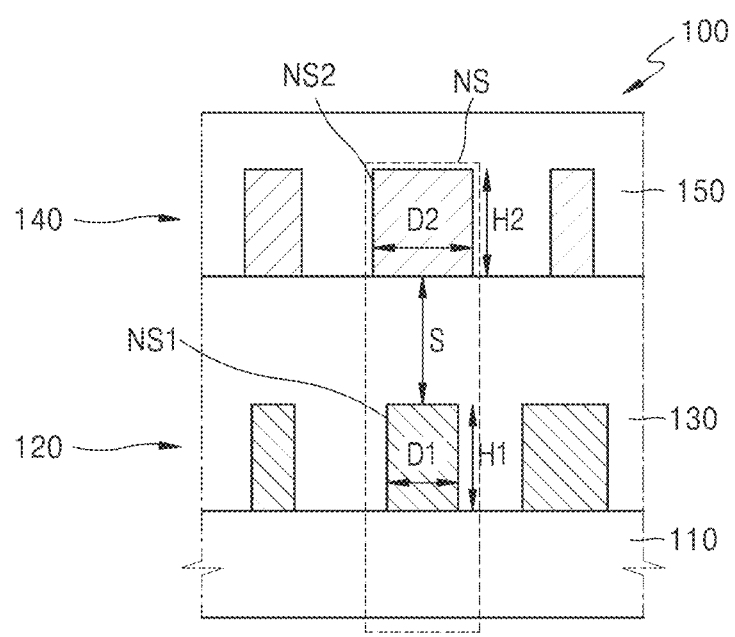
FIG. 6 is a partial magnified view showing design variables related to the performance of the meta-lens of FIG. 1 according to an embodiment.

FIG. 6 is a partial magnified view showing design variables related to the performance of the meta-lens 100 of FIG. 1.

Referring to FIG. 6, the plurality of first nanostructures NS1 that constitute the first layer 120 have a width D1 and a height H1, and these values may vary according to the locations of each individual nanostructure of the plurality of first nanostructures NS1 within the first layer. The plurality of second nanostructures NS2 that constitute the second layer 140 have a width D2 and a height H2, and these values may vary according to the locations of each individual nanostructure of the plurality of second nanostructures NS2 within the second layer. Also, it is depicted that a separation distance S between the first nanostructures NS1 and the second nanostructures NS2 is constant. However, the present embodiment is not limited thereto. In other words, the separation distance between the first nanostructures NS1 and the second nanostructures NS2 may vary according to position within the first and second layers.

In this structure, the interaction of the nanostructures may occur between the first nanostructures NS1 on the same layer, between the second nanostructures NS2 on the same layer, and between the first nanostructures NS1 and the second nanostructures NS2 adjacent to each other in the stacking direction. For example, the first nanostructures NS1 and the second nanostructures NS2 that are adjacent up and down (i.e., in the Z direction) may be regarded as third nanostructures NS that show a performance different from the performance expected in a single layer arrangement of the first nanostructures NS1 or in a single layer arrangement of the second nanostructures NS2. The shape distribution of the third nanostructures NS may be a main variable for the performance of the meta-lens 100. In FIG. 6, it is depicted that the first nanostructures NS1 and the second nanostructures NS2 adjacent up and down have different shapes. However, disclosed embodiments are not limited thereto. For example, in another location, the first nanostructures NS1 and the second nanostructures NS2 adjacent up and down may have the same shape.

Also, it is depicted that all of the first nanostructures NS1 have the same height and all of the second nanostructures NS2 have the same height. However, all of the first nanostructures NS1 may have heights different from each other and all of the second nanostructures NS2 may have heights different from each other.

The widths D1 and D2 of the first nanostructures NS1 and the second nanostructures NS2 may be sub-wavelength, and assuming that a shorter wavelength of the first wavelength $\lambda 1$ and the second wavelength $\lambda 2$ is $\lambda$, the widths D1 and D2 may be less than $\lambda$. That is, the widths D1 and D2 may have a value less than a wavelength from among all wavelengths in a focusing wavelength bandwidth of the meta-lens 100.

Assuming that a longer wavelength of the first wavelength $\lambda 1$ and the second wavelength $\lambda 2$ is $\lambda$, the heights H1 and H2 of the first nanostructures NS1 and the second nanostructures NS2 may be in a range from about $\lambda/3$ to about $(3\lambda)/2$.

The height H1 of the first nanostructures NS1 and the height H2 of the second nanostructures NS2 may be different from each other. A difference between the heights H1 and H2 may be determined so that the meta-lens 100 is operated as a transmission type meta-lens or a reflection type meta-lens. For example, assuming that a longer wavelength of the first wavelength $\lambda 1$ and the second wavelength $\lambda 2$ is $\lambda$, a difference between the height H1 and the height H2 is determined as approximately less than $\lambda/3$ so that the meta-lens 100 is realized as a transmission type meta-lens. However, the present embodiment is not limited thereto.

Assuming that a longer wavelength of the first wavelength $\lambda 1$ and the second wavelength $\lambda 2$ is $\lambda$, the separation distance S between the first nanostructures NS1 and the second nanostructures NS2 adjacent up and down may be in a range from about $\lambda/4$ to about $2\lambda$. When the distance S is in this range, the first and second layers can induce complicated near-field and/or far-field interaction of the light incident to and transmitted through the layers. As a result, various meta-lens functionalities can be developed such as achromatic lens, positive or negative dispersive lenses over broad bandwidth of wavelengths. The separation distance S may be in a range from about $\lambda/2$ to about $2\lambda$.

Figure 7:
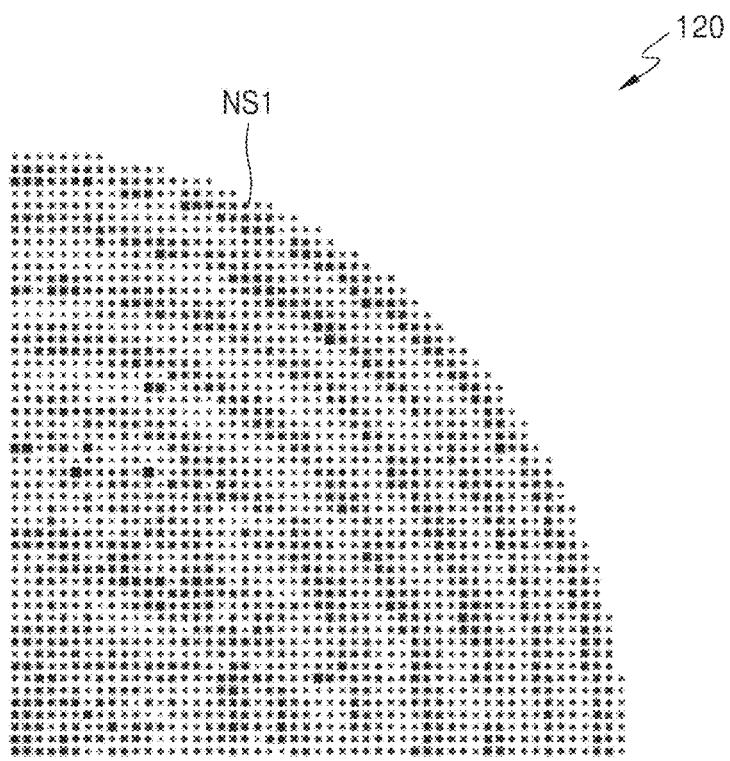
FIG. 7 is a plan view showing a nanostructure shape distribution of the first layer used in a computational model for performance analysis of the meta-lens of FIG. 1 according to an embodiment.
Figure 8:
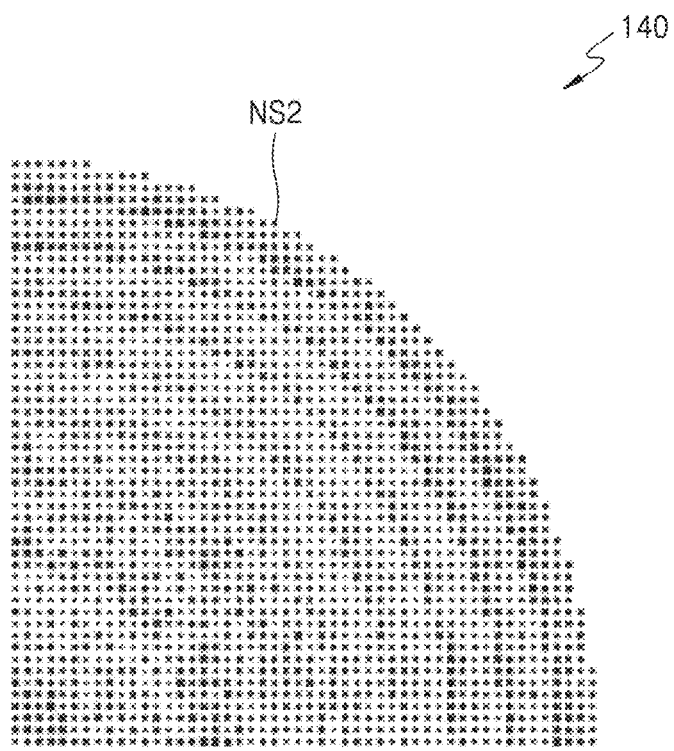
FIG. 8 is a plan view showing a nanostructure shape distribution of the second layer used in a computational model for performance analysis of the meta-lens of FIG. 1 according to an embodiment.

FIGS. 7 and 8 respectively are plan views showing shape distributions of the first nanostructures NS1 of the first layer 120 and the second nanostructures NS2 of the second layer 140 used in a computational model for performance analysis of the meta-lens 100 of FIG. 1. The figures show a quadrant of a model in which the nanostructures are arranged in a circular shape with a diameter of about 30 μm so as to realize a focal length of about 15 μm.

FIG. 9 is a diagram showing focusing performances of the meta-lens of FIG. 1 and a meta-lens according to a comparative example. As shown, an intensity distribution on a focal plane is shown for each of wavelengths 920 nm, 850 nm, and 780 nm for each of the meta-lens of FIG. 1 and the meta-lens of the comparative example.

In the comparative example, the meta-lens employs nanostructures in a single layer.

Referring to FIG. 9, the focusing performances of the comparative example meta-lens with respect to light of wavelengths of 920 nm and 780 nm are shown relatively lower than focusing performance with respect to light of wavelength of 850 nm. In contrast, the meta-lens of FIG. 1 exhibits a relatively similar focusing performance with respect to light of all three wavelengths.

In other words, in the case of the present embodiment, the focusing performance of a wider wavelength bandwidth is shown, and a difference in focusing performance according to the wavelength is relatively small when compared to the comparative example. Such focusing performance of the present embodiment corresponds to a low chromatic aberration when the meta-lens is applied to an imaging lens.

Figure 10:
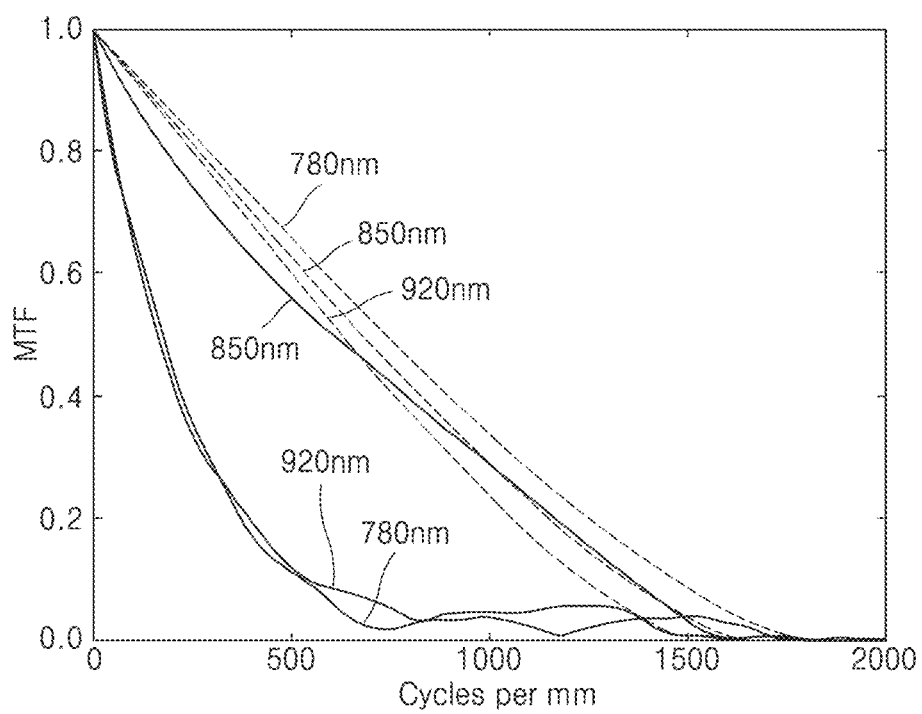
FIG. 10 is a graph showing a modulation transfer function (MTF) about a meta-lens according to a comparative example.
Figure 11:
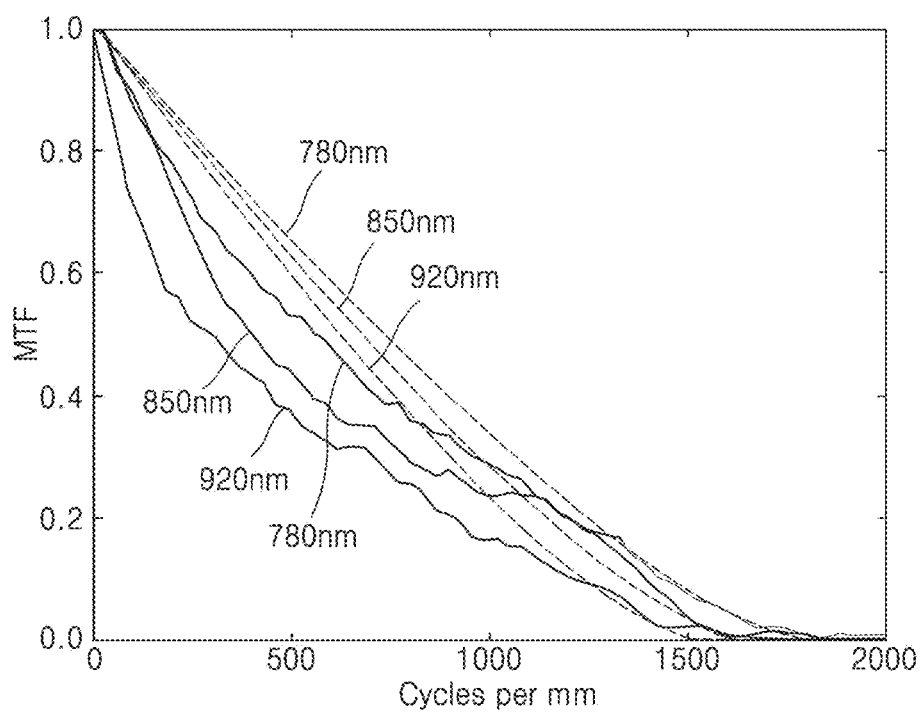
FIG. 11 is a graph showing an MTF about a meta-lens according to an embodiment.

FIGS. 10 and 11 respectively are modulation transfer function (MTF) graphs of a meta-lens according to a comparative example and a meta-lens according to an embodiment.

MTF graphs of a meta-lens with respect to light of three wavelengths are shown, and MTF graphs of an ideal lens considering a diffraction limit is indicated by dotted lines. In the MTF graphs, the horizontal axis represents the number of modulations (a spatial frequency) per unit length, and the vertical axis represents a relative frequency transfer characteristic (i.e., a contrast) normalized with respect to a spatial frequency of 0 cycles/mm. That is, the MTF graph indicates the imaging performance of the lens.

Referring to FIG. 10, with respect to light of 850 nm, the MTF graph of the meta-lens is similar to the case of a diffraction limit. However, in the cases of light of 780 nm and 920 nm, the MTF graphs show large differences from the graphs of diffraction limits. This result is in agreement with the fact that the meta-lens according to the comparative example showed excellent focusing performance for light of 850 nm but showed low focusing performances for light of 780 nm and 920 nm as shown in FIG. 9.

Unlike the above, as shown in FIG. 9, the meta-lens according to the present embodiment showed relatively similar and good focusing performances with respect to the light of 780 nm, 850 nm, and 920 nm. Similarly, as shown in FIG. 11, the difference between the MTF graphs (the solid lines) and graphs of the diffraction limit (the dashed lines) are relatively similar to each other at the three wavelengths, and the difference is less than that shown in the comparative example.

Figure 12:
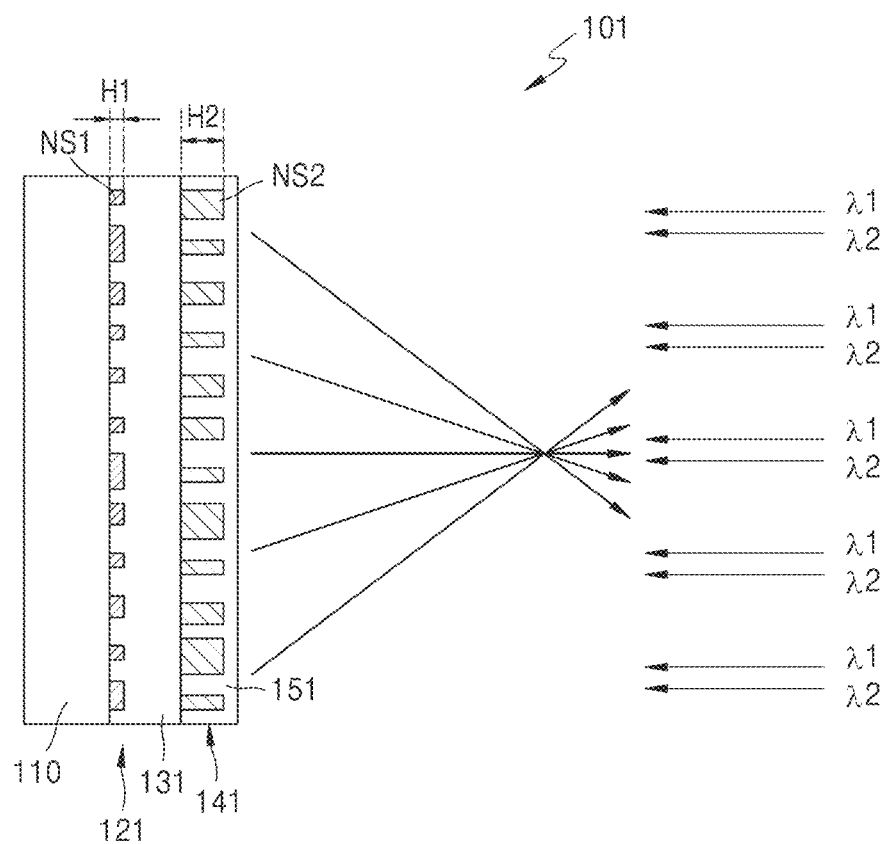
FIG. 12 is a schematic cross-sectional view of a configuration of a meta-lens according to an embodiment.

FIG. 12 is a schematic cross-sectional view of a configuration of a meta-lens 101 according to an embodiment.

The meta-lens 101 includes a substrate 110, a first layer 121 that is formed on the substrate 110 and includes a plurality of first nanostructures NS1, a spacer layer 131 covering the plurality of first nanostructures NS1, and a second layer 141 that is formed on the spacer layer 131 and includes a plurality of second nanostructures NS2. A protection layer 151 covering the plurality of second nanostructures NS2 may further be included in the meta-lens 101.

The shape distribution of the first nanostructures NS1 and the second nanostructures NS2 of the meta-lens 101 is different from the meta-lens 100 of FIG. 1 at a determined point so that the meta-lens 101 according to the present embodiment is operated as a reflection type meta-lens.

In the meta-lens 101, the shape distribution of the first nanostructures NS1 and the second nanostructures NS2 may be determined so that the meta-lens 101 focuses light of wavelength bandwidths including a first wavelength λ1 and a second wavelength λ2 as a reflection type meta-lens. For example, the meta-lens 101 may be operated as a concave mirror.

A height H1 of the first nanostructures NS1 arranged on the first layer 121 may be less than a height H2 of the second nanostructures NS2 arranged on the second layer 141 so that light incident upon the first layer 121 after passing through the second layer 141 is reflected and focused back towards the second layer 141. For example, a difference between the height H1 of the first nanostructures NS1 and the height H2 of the second nanostructures NS2 may be equal to or greater than λ/4 assuming that a longer wavelength of the first wavelength λ1 and the second wavelength λ2 is λ.

The meta-lenses 100 and 101 described above may focus light of desired wavelength bandwidths to a desired focal length by setting a nanostructure shape distribution of a plurality of layers, and thus, may be applied to various optical apparatuses.

Figure 13:
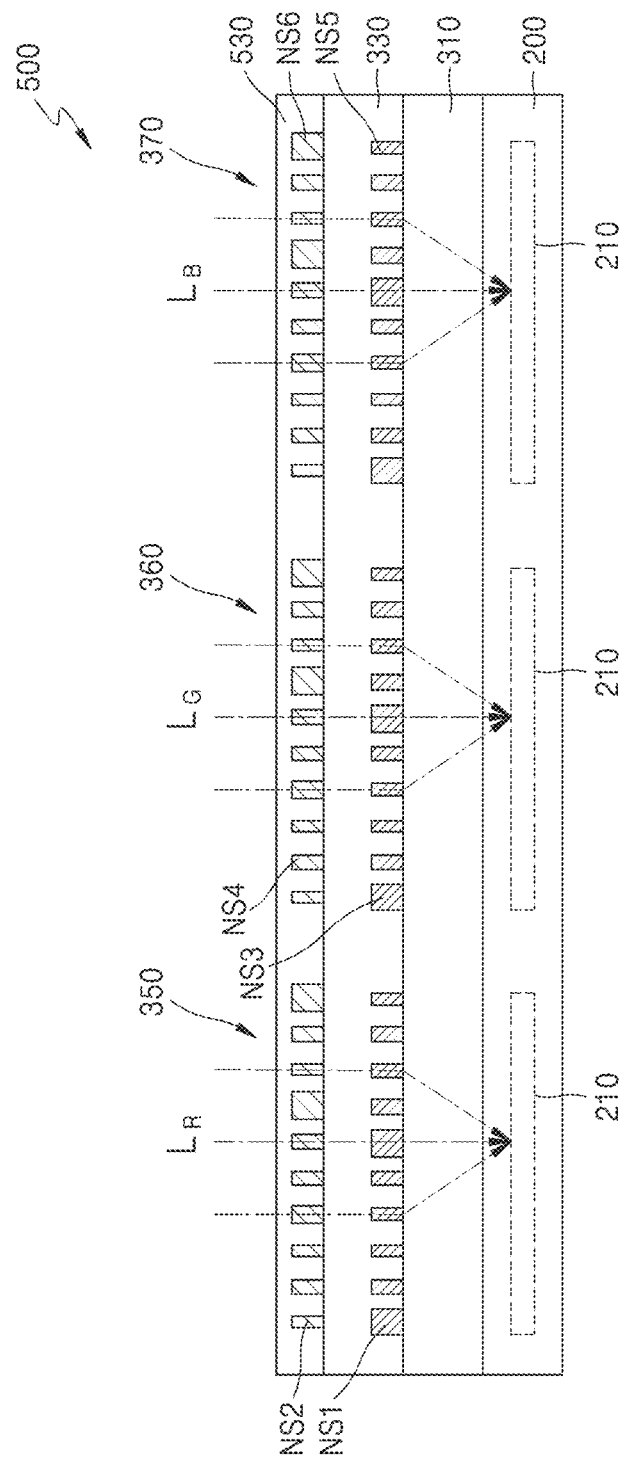
FIG. 13 is a schematic cross-sectional view of a configuration of an image sensor according to an embodiment.

FIG. 13 is a schematic cross-sectional view of a configuration of an image sensor 500 according to an embodiment.

The image sensor 500 includes a sensor substrate 200 including a plurality of photo-sensing cells 210, and a first meta-lens 350, a second meta-lens 360, and a third meta-lens 370 respectively arranged to face the photo-sensing cells 210 on the sensor substrate 200.

The photo-sensing cells 210 may include elements configured to convert an optical signal to an electrical signal. For example, the photo-sensing cells 210 may include a charge-coupled device (CCD), a complementary metal-oxide-semiconductor (CMOS), a photodiode, etc.

The first meta-lens 350 may include a plurality of first nanostructures NS1 and a plurality of second nanostructures NS2 that form a layer different from a layer of the plurality of first nanostructures NS1. In the first meta-lens 350, the shape distribution of the first nanostructures NS1 and the second nanostructures NS2 may be determined so as to focus light LR of a red wavelength bandwidth.

The second meta-lens 360 may include a plurality of first nanostructures NS3 and a plurality of second nanostructures NS4 that form a layer different from a layer of the plurality of first nanostructures NS3. In the second meta-lens 360, the shape distribution of the first nanostructures NS3 and the second nanostructures NS4 may be determined so as to focus light LG of a green wavelength bandwidth.

The third meta-lens 370 may include a plurality of first nanostructures NS5 and a plurality of second nanostructures NS6 that form a layer different from a layer of the plurality of first nanostructures NS5. In the second meta-lens 360, the shape distribution of the first nanostructures NS5 and the second nanostructures NS6 may be determined so as to focus light LB of a blue wavelength bandwidth.

The first, second, and third meta-lenses 350, 360, and 370 may share a substrate 310 supporting the plurality of nanostructures NS1, NS3, and NS5 and a spacer layer 330 supporting the plurality of nanostructures NS2, NS4, and NS6, and also may share a protection layer 530 covering the plurality of second nanostructures NS2, NS4, and NS6. The plurality of nanostructures NS1, NS3, and NS5 that form a first layer on the substrate 310 may include the same material, and the plurality of nanostructures NS2, NS4, and NS6 that form a second layer on the spacer layer 330 may include the same material.

The image sensor 500 may further include a filter (not shown) configured to filter incident light so that the red light LR, the green light LG, and the blur light LB respectively enter the first meta-lens 350, the second meta-lens 360, and the third meta-lens 370.

The image sensor 500 may have a structure in which the first meta-lens 350, the second meta-lens 360, and the third meta-lens 370 are monolithically formed on the sensor substrate 200. The first meta-lens 350, the second meta-lens 360, and the third meta-lens 370 have a very small thickness compared to a focusing lens of the related art that shows a physical curvature, and thus, a total volume of the image sensor 500 may be reduced. Therefore, the image sensor 500 may be easily applied to a small size electronic apparatus.

Figure 14:
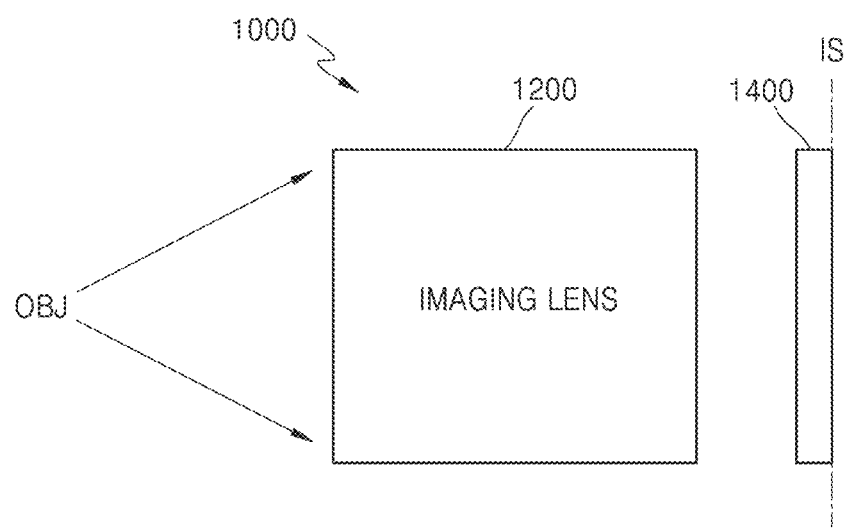
FIG. 14 is a schematic conceptual view of a configuration of an imaging apparatus according to an embodiment.
Figure 15:
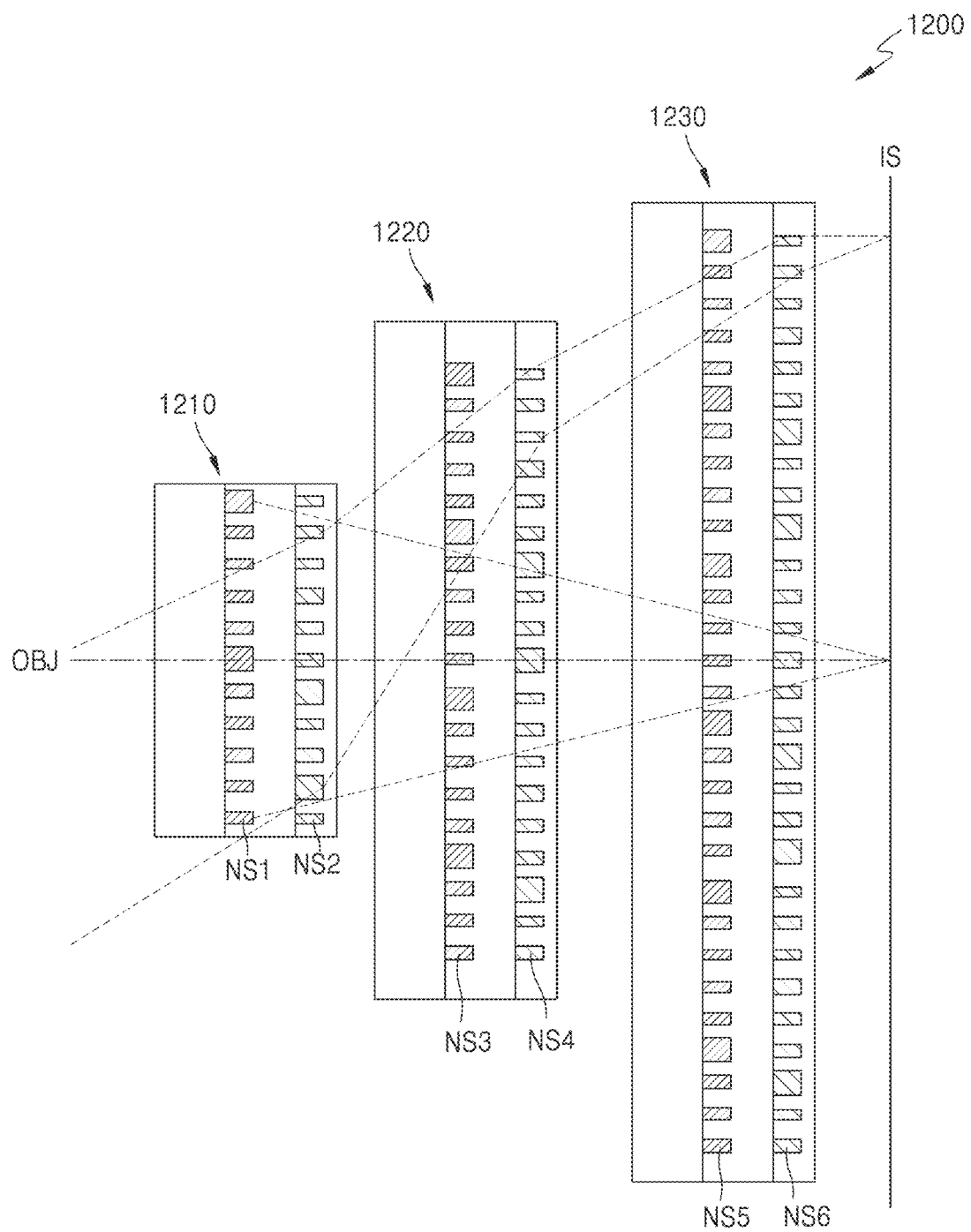
FIG. 15 is a cross-sectional view of an example imaging lens to be employed in the imaging apparatus of FIG. 14 according to an embodiment.

FIG. 14 is a schematic conceptual view of a configuration of an imaging apparatus 1000 according to an embodiment. FIG. 15 is a cross-sectional view of an example imaging lens 1200 to be employed in the imaging apparatus 1000 of FIG. 14.

The imaging apparatus 1000 includes the imaging lens 1200 and an image sensor 1400 configured to convert an optical image of an object OBJ formed by the imaging lens 1200 into an electrical signal.

The image sensor 1400 is arranged on an image surface IS on which the optical image of the object OBJ formed by the imaging lens 1200 is formed. The image sensor 1400 may include an array of CCD, CMOS, photodiode, etc. that generates an electrical signal by sensing light. The image sensor 1400 may have a structure including a meta-lens such as that shown in FIG. 13, but the present embodiment is not limited thereto.

The imaging lens 1200 may include at least one meta-lens. The at least one meta-lens included in the imaging lens 1200 may be a meta-lens including a multilayer stacking layer as depicted in FIG. 1 and a shape distribution of the plurality of nanostructures included therein may be determined so as to focus light of the visible light bandwidth.

Referring to FIG. 15, the imaging lens 1200 may include a first meta-lens 1210, a second meta-lens 1220, and a third meta-lens 1230.

The first meta-lens 1210, the second meta-lens 1220, and the third meta-lens 1230 may form an optical image of the object OBJ on the image surface IS by controlling an optical path of light reflected by the object OBJ, and, for this purpose, refractive indexes and distances of each of the lenses are determined.

The first meta-lens 1210 may include a plurality of first nanostructures NS1 and a plurality of second nanostructures NS2 that are arranged as a multilayer, the second meta-lens 1220 may include a plurality of first nanostructures NS3 and a plurality of second nanostructures NS4 that are arranged as a multilayer, and the third meta-lens 1230 may include a plurality of first nanostructures NS5 and a plurality of second nanostructures NS6 that are arranged as a multilayer.

The first meta-lens 1210, the second meta-lens 1220, and the third meta-lens 1230 may have positive refractive power or negative refractive power, and the imaging lens 1200 may include at least one lens having positive refractive power and at least one lens having negative refractive power.

In FIG. 15, it is depicted that the imaging lens 1200 includes three lenses as an example, but the present embodiment is not limited thereto. The imaging lens 1200 may include three or more of the meta-lenses in which lenses of positive refractive power and lenses of negative refractive power are combined in various sequences in consideration of performances of image angle, F number, magnification, and focal length.

The first meta-lens 1210, the second meta-lens 1220, and the third meta-lens 1230 included in the imaging lens 1200 according to the present embodiment may have a wide focusing wavelength bandwidth and a small change of a focal location among wavelengths within the wavelength bandwidth, that is, a low color aberration. Also, the shape distributions of the nanostructures NS1 through NS6 included in the first through third meta-lenses 1210, 1220, and 1230 may be determined so as to improve various kinds of aberrations, for example, a coma aberration, distortion, etc. Accordingly, a favorable imaging with respect to the object OBJ may be possible.

The meta-lens described above may realize a thin film lens by using nanostructures, and may realize the same focal length with respect to a wide wavelength bandwidth by arranging the nanostructures in a multilayer.

The meta-lens described above may readily control various aberrations, may be applied to an imaging lens, and may be employed in various optical apparatuses, such as image sensors, imaging apparatuses, etc.

The meta-lens and an optical apparatus including the meta-lens have been described with reference to the accompanying drawings. However, it will be understood by those skilled in the art that various changes in form and details may be made therein without departing from the spirit and scope of the disclosure. The embodiments should be considered in descriptive sense only and not for purposes of limitation. Therefore, the scope of the disclosure is defined not by the detailed description but by the appended claims, and all differences within the scope will be construed as being included in the disclosure.

What is claimed is:

1. A meta-lens comprising:
   a substrate;
   a first layer arranged on the substrate, the first layer comprising a plurality of first nanostructures comprising a material having a refractive index different from a refractive index of the substrate;
   a spacer layer covering the plurality of first nanostructures, the spacer layer comprising a material having a refractive index different from the refractive index of the plurality of first nanostructures; and
   a second layer arranged on the spacer layer, the second layer comprising a plurality of second nanostructures comprising a material having a refractive index different from the refractive index of the spacer layer,
   wherein a first shape distribution of the plurality of first nanostructures and a second shape distribution of the plurality of second nanostructures are set so as to focus light of a first wavelength and light of a second wavelength different from the first wavelength at a same focal length,
   wherein the first shape distribution and the second shape distribution are configured to focus light of a wavelength bandwidth including the first wavelength and the second wavelength, and
   wherein the wavelength bandwidth comprises one from among a red wavelength bandwidth, a green wavelength bandwidth, and a blue wavelength bandwidth.

2. The meta-lens of claim 1, wherein the wavelength bandwidth comprises a red wavelength bandwidth, a green wavelength bandwidth, and a blue wavelength bandwidth.

3. The meta-lens of claim 1, wherein a dimension of the plurality of first nanostructures and the plurality of second nanostructures is less than the first wavelength and less than the second wavelength.

4. The meta-lens of claim 1, wherein a first height of the plurality of first nanostructures and a second height of the plurality of second nanostructures in a direction of stacking the first layer and the second layer are in a range from $\lambda/3$ to $(3\lambda)/2$, where $\lambda$ is a longer wavelength of the first wavelength and the second wavelength.

5. The meta-lens of claim 1, wherein the first shape distribution is different from the second shape distribution.

6. The meta-lens of claim 1, wherein each nanostructure from among the plurality of first nanostructures and the plurality of second nanostructures has a column shape.

7. The meta-lens of claim 6, wherein each first nanostructure from among the plurality of first nanostructures has a first height different from a second height of each second nanostructure from among the plurality of second nanostructures.

8. The meta-lens of claim 7, wherein a difference between the first height and the second height is set so that the meta-lens operates as a reflection type lens.

9. The meta-lens of claim 8, wherein the difference between the first height and the second height is $\lambda/4$ or greater where $\lambda$ is a longer wavelength of the first wavelength and the second wavelength.

10. The meta-lens of claim 7, wherein the difference between the first height and the second height is set so that the meta-lens operates as a transmission type lens.

11. The meta-lens of claim 10, wherein the difference between the first height and the second height is $\lambda/3$ or less where $\lambda$ is a longer wavelength of the first wavelength and the second wavelength.

12. The meta-lens of claim 1, wherein the refractive index of the substrate is less than the refractive index of the plurality of first nanostructures and less than the refractive index of the plurality of second nanostructures, and
    wherein the refractive index of the spacer layer is less than the refractive index of the plurality of first nanostructures and less than the refractive index of the plurality of second nano structures.

13. The meta-lens of claim 1, wherein a difference between the refractive index of the substrate and the refractive index of the plurality of first nanostructures is 0.5 or greater.

14. The meta-lens of claim 13, wherein a difference between the refractive index of the plurality of first nanostructures and the refractive index of the spacer layer is 0.5 or greater.

15. The meta-lens of claim 14, wherein a difference between the refractive index of the spacer layer and the refractive index of the plurality of second nanostructures is 0.5 or greater.

16. The meta-lens of claim 1, further comprising:
    a protection layer covering the plurality of second nanostructures.

17. The meta-lens of claim 16, wherein a difference between a refractive index of the protection layer and the refractive index of the plurality of first nanostructures is 0.5 or greater.

18. An imaging apparatus comprising:
    an imaging lens comprising the meta-lens of claim 1; and
    an image sensor configured to convert an optical image formed by the imaging lens into an electrical signal.

19. A meta-lens comprising:
    a substrate;
    a first layer arranged on the substrate, the first layer comprising a plurality of first nanostructures comprising a material having a refractive index different from a refractive index of the substrate;
    a spacer layer covering the plurality of first nanostructures, the spacer layer comprising a material having a refractive index different from the refractive index of the plurality of first nanostructures; and a second layer arranged on the spacer layer, the second layer comprising a plurality of second nanostructures comprising a material having a refractive index different from the refractive index of the spacer layer, wherein a first shape distribution of the plurality of first nanostructures and a second shape distribution of the plurality of second nanostructures are set so as to focus light of a first wavelength and a light of a second wavelength different from the first wavelength at a same focal length, and wherein a separation distance between the plurality of first nanostructures and the plurality of second nanostructures in the stacking direction is in a range from $\lambda/4$ to $2\lambda$, where $\lambda$ is a longer wavelength of the first wavelength and the second wavelength.

* * * * *